United States Patent [19]

Chemin et al.

[11] 4,339,773
[45] Jul. 13, 1982

[54] DEVICE FOR POWER AMPLIFICATION OF A COMPOSITE TELEVISION SIGNAL

[75] Inventors: Henri Chemin; Claude Cluniat; Bernard Beltzer, all of Chatou, France

[73] Assignee: L.G.T Laboratoire General des Telecommunications, Chatou, France

[21] Appl. No.: 187,822

[22] Filed: Sep. 16, 1980

[30] Foreign Application Priority Data

Sep. 19, 1979 [FR] France .................. 79 23338

[51] Int. Cl.³ .................. H04N 5/14; H04N 5/38
[52] U.S. Cl. .................. 358/184; 358/186
[58] Field of Search .................. 358/184, 186; 455/7, 455/108, 109

[56] References Cited

U.S. PATENT DOCUMENTS 4,263,617  4/1981  Chemin et al. .................. 358/186

Primary Examiner—John C. Martin

[57] ABSTRACT

A power amplification device for high-frequency amplitude-modulated signals comprises a first and a second amplifier employed respectively for amplification of a reduced-level HF modulated carrier signal and for amplification of the simple HF carrier signal extracted from the HF standard modulated signal and supplies in parallel the amplifier and a subtracter device through which the first amplifier receives the HF standard modulated signal. This results in excellent performances, high efficiency and stability, ease of maintenance and reliability.

5 Claims, 3 Drawing Figures

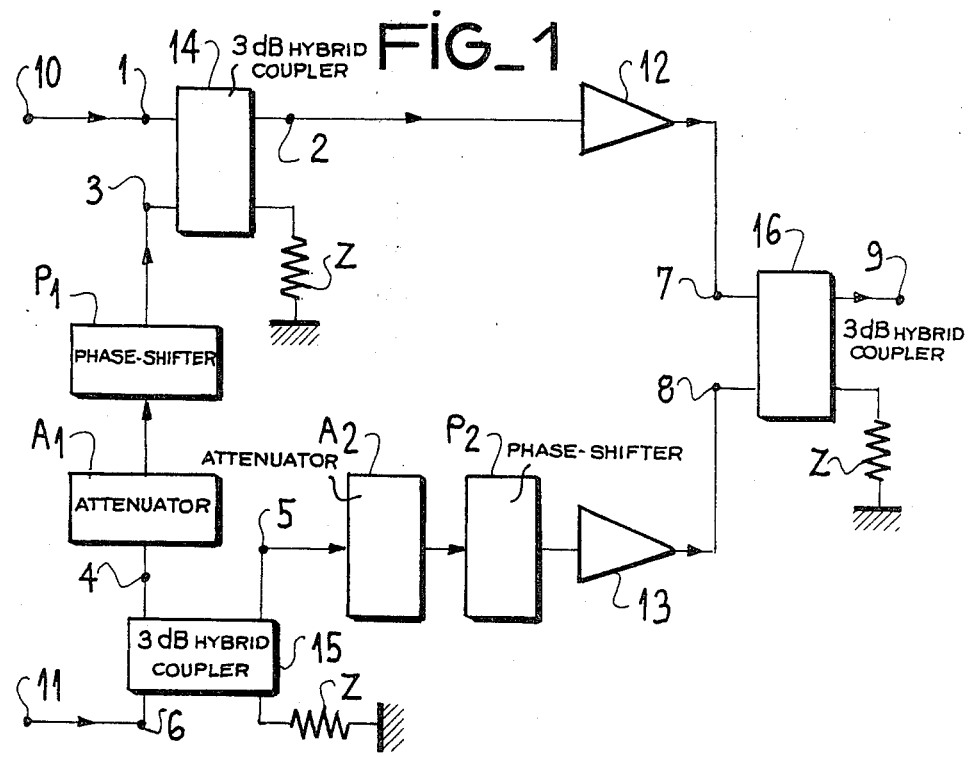
FIG_1
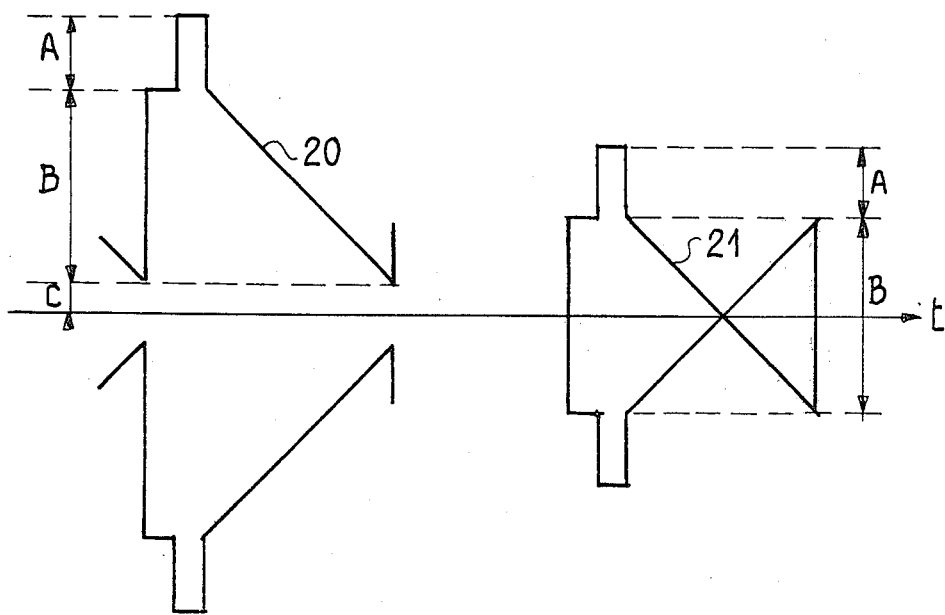
FIG_2

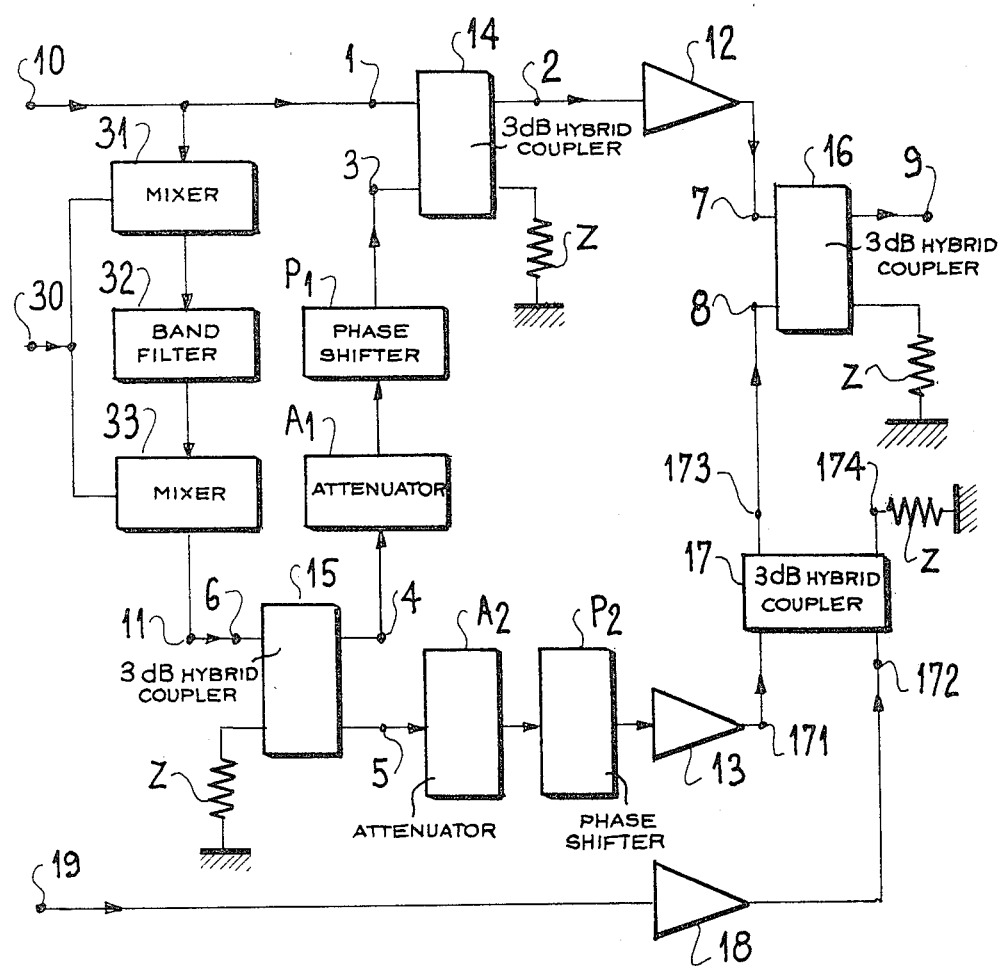
FIG_3

DEVICE FOR POWER AMPLIFICATION OF A COMPOSITE TELEVISION SIGNAL

This invention relates to devices for power amplification of amplitude-modulated signals, in particular in television transmitters and rebroadcast transmitters which permit the achievement of enhanced efficiency, linearity and reliability by providing separate amplification of modulated reduced-carrier signals and of an unmodulated carrier signal.

All amplitude-modulating transmitters must satisfy strict conditions of linearity of amplitude of the modulated signal with respect to those of the modulating signal.

The result thereby achieved is very low overall peak efficiency of transmitters of this type and especially a severe limitation of maximum available power in the case of amplifiers of the transistorized type.

As disclosed in U.S. Pat. No. 06,076,776 entitled "A system for the transmission of a composite television signal," it is known to construct a system in which the videofrequency signals to be transmitted are applied to a ring modulator which delivers a modulated reduced-intermediate-frequency carrier signal. This signal is then transposed on the final frequency and power-amplified in class AB amplifiers. Furthermore, the carrier signal employed for modulation is then in turn transposed and power-amplified in a separate chain in which amplification is performed in this case in class C and therefore with very high efficiency.

The patent application cited in the foregoing shows how a standard television signal transmitter is constructed so as to provide distinctly improved efficiency, linearity and reliability in comparison with conventional systems.

Experience has shown, however, that a system of this type presents a certain number of problems under operating conditions.

From modulation to final amplification, the signals employed in this system are non-standardized or in other words consist of reduced-carrier signals resulting in maintenance operations which are different from those involved in conventional transmitters. Moreover, certain instabilities arise from the fact that the recombination of signals collected at the output of the two separate amplification chains is separated from the devices in which they were generated by a large number of stages.

The aim of the invention is to overcome these disadvantages while fully retaining all the advantages mentioned above, that is, separate amplification of a carrier signal and of a reduced-level modulated carrier signal while maintaining standardized signals in the intermediate frequency stages.

In accordance with the invention, a device is provided for power amplification of a composite television signal constituted by at least one carrier signal at the transmission frequency modulated by an item of video frequency information. Said device comprises a modulated carrier signal input, means for generating at two separate outputs a reduced-level modulated carrier signal and an unmodulated carrier signal which are coupled to the signal input, amplification means comprising a first amplifier having one input coupled to one output of the generating means and a second amplifier having one input coupled to the other output of the generating means for separate amplification of the reduced-level modulated carrier signal and of the unmodulated carrier signal, and combination means having two inputs connected to the outputs of the amplifiers for delivering the amplified modulated carrier signal to be transmitted.

These and other features of the invention will be more apparent to those versed in the art upon consideration of the following description and accompanying drawings, in which:

FIG. 1 shows one example of construction of a power amplification device in accordance with the invention;

FIG. 2 is an explanatory diagram;

FIG. 3 shows an alternative embodiment of the amplification device in accordance with the invention.

In FIG. 1, a terminal 10 for receiving a high-frequency carrier signal modulated by video frequency signals is connected to the access 1 of a first pair of combined accesses of a 3-dB coupler 14, the second access 3 of which is connected to the output of a variable phase-shifter $P_1$. One of the accesses of the second pair of associated accesses of the coupler 14 is connected to a load impedance Z. The other access 2 of said second pair is connected to the input of an amplifier 12 having a gain G, the output of which supplies the access 7 of the first pair of combined accesses of a second 3-dB hybrid coupler 16, the second access 8 of which is connected to the output of an amplifier 13 having the same gain G. One of the accesses of the second pair of associated accesses of the coupler 16 is connected to a load impedance Z and the other access is connected to the output terminal 9 of the amplification device. A second input terminal 11 which is intended to receive the unmodulated carrier signal is connected to one access 6 of a first pair of associated accesses of a 3-dB coupler 15, the other access of which is connected to a load impedance Z. The accesses 4 and 5 of the second pair of associated accesses of said coupler are connected respectively to the input of the variable phase-shifter $P_1$ through a variable attenuator $A_1$ and to the input of the amplifier 13 through a variable attenuator $A_2$ followed by a variable phase-shifter $P_2$.

It is assumed that the accesses of the couplers 14, 15 and 16 have the same impedance Z.

The operation will be described with reference to FIG. 2 in which curve 20 represents as a function of the time interval t the envelope of a carrier signal which is negatively modulated by a video frequency signal having a standard peak level of 1 volt. Thus $A+B+C=1$ volt, where A is the synchronizing pulse level such that $A=0.25$ volt, B is the level difference between absolute black and absolute white such that $B=0.65$ volt, and C is the minimum carrier level such that $C=0.1$ volt. Curve 21 represents the same signal after combination in phase opposition with a carrier signal having the level $(B/2)+C=0.425$ volt, thus resulting in a new peak level equal to $A+(B/2)=0.575$ volt.

The signal represented by curve 21 and the carrier are amplified respectively by the amplifier 12 which operates in class AB and the amplifier 13 which operates in class C. The assembly consisting of these two amplifiers 12 and 13 as well as the coupler 16 which is employed in this case as a summing device is similar to the assembly employed in the patent application cited earlier and has all the characteristics and advantages set forth in detail in the application aforesaid, especially when the reduced carrier level is chosen in such a manner as to obtain identical absolute black and white levels as in the case of the signal represented by curve 21.

However, the formation of the modulated signal with reduced carrier level is obtained in the case of FIG. 1 from the unmodulated carrier signal applied to the input terminal 11 and from the standard modulated signal which is present at the input terminal 10 of the amplification device. The unmodulated HF carrier signal is in turn obtained by collecting part of the modulated HF signal and suppressing the sidebands. The corresponding device is not shown in FIG. 1. The unmodulated carrier signal which is present at the terminal 11 is divided by the coupler 15 into two signals having the same power and applied respectively to the coupler 14 employed as an algebraic subtractor via $A_1$ and $P_1$ and to the amplifier 13 via $A_2$ and $P_2$.

The particular properties of this arrangement will now be shown.

Let M be the signal which is negatively modulated by the standard video frequency signal as represented by curve 20 of FIG. 2 and applied with a peak level of 1 volt taken as a reference to the input terminal 10 of the amplification device of FIG. 1. This signal which is present at the input 1 of the coupler 14 and taken as a phase reference is accordingly written: $M_1 = M \angle O$ At the output of said coupler, the signal M becomes $$M_2 = \frac{\sqrt{2}}{2} M \angle O$$

since the phase rotations produced by the connections will not be considered for the moment.

Let C be the unmodulated carrier signal extracted from the signal M and assumed to be applied to the input terminal 11 with a peak level of 1 volt.

At the input terminal 6 of the coupler 15, the signal C will have a phase of any predetermined value $\varphi$ with respect to M and we may then write:

$$C_6 = C \angle \varphi$$

At the output 4 of the coupler 15, the signal C retains the same phase but experiences a 3-dB attenuation, whence $$C_4 = \frac{\sqrt{2}}{2} C \angle \varphi$$

and after passing through the attenuator $A_1$ and the phase-shifter $P_1$, it will be given respectively an attenuation coefficient $\alpha_1$ and a phase lag $\varphi_1$. There will thus be present at the input 3 of the coupler 14 a signal C such that $$C_3 = \frac{\sqrt{2}}{2} \alpha_1 C \angle \varphi - \varphi_1$$

At the output 2 of the coupler 14, the signal C undergoes a further attenuation of 3-dB and a phase lag of $\pi/2$, whence $$C_2 = \frac{\alpha_1}{2} C \angle \varphi - \varphi_1 - \frac{\pi}{2}$$

The resultant signal R delivered by the coupler 14 at its output terminal 2 will be $$R_2 = M_2 + C_2$$

$$= \frac{\sqrt{2}}{2} M \angle O + \frac{\alpha_1}{2} C \angle \varphi - \varphi_1 - \frac{\pi}{2}$$

In order to obtain the signal represented by curve 21 of FIG. 2, the coupler 14 must perform the function of an algebraic subtracter. To this end, it must be ensured that $$\varphi - \varphi_1 - \frac{\pi}{2} = \pi$$

whence $$\varphi_1 = \varphi + \frac{\pi}{2}$$

which is the phase lag to be given to the phase-shifter $P_1$.

It must also be ensured that the amplitudes of the signals C and M have the same peak amplitude ratio as 1 volt with respect to $1 - (A + (B/2))$ volt, that is, $$\frac{1}{1 - 0.575} = 2.35$$

whence $$\frac{\sqrt{2}}{\alpha_1} = 2.35$$

and $\alpha_1 = 0.6$, namely 4.4 dB

With these adjustments of attenuator $A_1$ and phase-shifter $P_1$, we may then write a new value $R'_2$ of $R_2$:

$$R'_2 = \frac{\sqrt{2}}{2} M \angle O + 0.3 C \angle \pi$$

Moreover, there is obtained at the output 5 of the coupler 15 a signal $C_5$ delayed by $(\pi/2)$ and reduced by 3 dB, in relation to $C_6$ namely:

$$C_5 = \frac{\sqrt{2}}{2} C \angle \varphi - \frac{\pi}{2}$$

Postulating that $\alpha_2$ is the coefficient of attenuation of the attenuator $A_2$, that $\varphi$ is the phase-lag of the phase-shifter $P_2$ and that G is the common gain of the amplifiers 12 and 13, the signal C becomes at the input 8 of the coupler 16:

$$C_8 = G \frac{\sqrt{2}}{2} \alpha_2 C \angle \varphi - \varphi_2 - \frac{\pi}{2}$$

This latter arrives at the output terminal 9 after an attenuation of 3 dB and a phase-lag of $(\pi/2)$, whence $$C_9 = G \frac{\alpha_2}{2} C \angle \varphi - \varphi_2 - \pi$$

The resultant signal R arrives at the same point and is assumed to retain the same phase starting from the output 2 of the coupler 14. However, said signal is amplified by the coefficient G in the amplifier 12 and subjected to a 3-dB attenuation by the coupler 16, whence $$R_9 = G\frac{M}{2} \angle O + \frac{a_1 G}{2\sqrt{2}} C \angle \varphi - \varphi_1 - \frac{\pi}{2}$$

The fresh resultant signal S obtained at the output of the device will be $$S = C_9 + R_9$$

$$= G\frac{M}{2} \angle O + G\frac{a_2}{2} C \angle \varphi - \varphi_2 - \pi +$$

$$\frac{a_1 G}{2\ 2} C \angle \varphi - \varphi_1 - \frac{\pi}{2}$$

In order to obtain $S = G(M/2)\angle O$, that is to say a signal which is identical with the modulated signal applied to the amplification device except for a difference in level, it is only necessary to put $$\frac{a_2}{2} = \frac{a_1}{2\sqrt{2}} \text{ that is, } a_1 = a_2 \sqrt{2}$$

with the result that the two attenuators therefore differ by 3 dB, and that:

$$\varphi_2 - \varphi_1 = \frac{\pi}{2}$$

that is, $$(\varphi - \varphi_2 - \pi) - \left(\varphi - \varphi_1 - \frac{\pi}{2}\right) = \pi$$

It is of interest to note that this result is obtained independently of the amplitude of the signal C and of its original phase $\varphi$ with respect to the modulated signal M.

This insensitivity of the degree of modulation of the signal resulting from variations in relative amplitude and phase arises from the fact that the circuit of FIG. 1 behaves as a balanced bridge; when these variations take place, they affect only the crossover point or in other words the phase reversal of the carrier on the signal represented by curve 21.

It has in fact been seen that the signal 21 as shown is obtained only if $$\varphi_1 = \varphi + \frac{\pi}{2}$$

and therefore a function of $\varphi$ and if the attenuator $A_1$ has a well-determined value of 4.4 dB, thus fixing the value of the signal level C.

Since the values of $A_1$ and $A_2$ have now been determined, the attenuator $A_1$ having a lower value can clearly be dispensed with on condition that the level C is reduced by the same value, namely 4.4 dB. The attenuator $A_2$ will then produce an attenuation of only 3 dB instead of 7.4 dB.

It is apparent that, in practice, the calculated values of phase lag must be modified as a function of the phase rotations produced by the circuit elements.

Furthermore, experiments have shown that a slight systematic phase shift between the signals M and C, that is to say of $\varphi$ with respect to $\varphi_1$, would permit elimination of the slight variations in differential gain produced at the crossover point within the amplifier 12 as a result of turn-on of class AB power transistors.

The following figure, which shows an alternative form of the figure discussed in the foregoing, provides an example of the device for filtering the unmodulated carrier signal and includes a channel for amplification of audiofrequency signals.

In FIG. 3, the same elements which are employed in the same manner as in FIG. 1 are designated by the same references. The input terminal 11 is connected to the output of a mixer 33, the input of which is connected to the terminal 10 through a band filter 32 preceded by a mixer 31. The mixers 31 and 33 each have a second input connected to the input terminal 30. Moreover, the output of the amplifier 13 is coupled in this case to the coupler 16 through the accesses 171 and 173 of a fourth coupler 17, the access 174 of which is connected to a load impedance Z and the access 172 of which is connected to the output of a power amplifier 18. A carrier signal modulated by audiofrequency signals is applied to the input of said power amplifier via a terminal 19.

The unmodulated carrier signal is isolated within the filter 32 which is a quartz-crystal narrow-bandpass filter centered on an intermediate frequency which is equal to the frequency employed for modulation of the videofrequency signals. The transposition signal applied to the terminal 30 is a signal having a frequency equal to that of the videofrequency carrier signal plus or minus the intermediate frequency. Said transposition signal may be produced either by a quartz-controlled external generator or by the transposition generator of the transmitter with which the amplification device is associated.

The coupling unit 17 shows in schematic form the arrangement of a conventional diplexer comprising two 3-dB couplers in series with a protection system for the difference in carrier frequencies added by said diplexer, thus making it possible to prevent practically all losses on each component.

The arrangement in which coupling of the audiofrequency signals is effected on the upstream side of the coupler 16 rather than at the output 9 of said coupler 16 serves to prevent any interference with the group delay time in the channel modulated by the audiofrequency signals.

What is claimed is:

1. A device for power amplification of a composite television signal comprising at least one standard carrier signal at the transmission frequency modulated by an item of videofrequency information, wherein said device comprises a modulated high frequency carrier signal input, means for generating at two separate outputs a reduced-level HF modulated carrier signal and an unmodulated HF carrier signal which are connected to the HF signal input, amplification means comprising a first HF amplifier having one input coupled to one output of the generating means and a second HF amplifier having one input coupled to the other output of the generating means for separate amplification of the reduced-level modulated HF carrier signal and of the unmodulated HF carrier signal, and combination means having two inputs connected to the outputs of the amplifiers for delivering the amplified modulated carrier signal to be transmitted.

2. A device for power amplification of a composite television signal comprising at least one standard carrier signal at the transmission frequency modulated by a videofrequency item of information, wherein the device comprises: a modulated HF carrier signal input; a subtracter circuit having a first input coupled to the signal input, a second input, and one output for delivering a reduced-level modulated HF carrier signal; a first HF amplifier having one input coupled to the output of the subtracter circuit and one output; a circuit for filtering the unmodulated HF carrier signal having one input coupled to the signal input of the device and one output; a coupling device having one input coupled to the output of the filtering circuit, a first output coupled to the second input of the subtracter circuit and a second output; a second amplifier having one input coupled to the second output of the coupling device and one output; and an output summing circuit having two inputs respectively coupled to the outputs of the first and second amplifiers, and one output constituting the output of the device for delivering the power-amplified modulated HF carrier signal which is the sum of the amplified reduced-level modulated HF carrier signal and of the amplified unmodulated HF carrier signal.

3. An amplification device according to claim 2, wherein the first and the second amplifier belong respectively to classes AB and C and have the same nominal gain, the first and the second output of the coupling device being respectively coupled to the second input of the subtracter circuit through a first variable attenuator in series with a first variable phase-shifter and to the input of the second amplifier through a second variable attenuator in series with a second variable phase-shifter, the first phase-shifter and the first attenuator being so adjusted as to obtain at the output of the subtracter circuit respectively a phase opposition subject to a difference of a few degrees of the unmodulated and modulated carrier signals and an equality of modulation level in the case of absolute black and white, and the second phase-shifter and the second attenuator being adjusted so as to obtain respectively at the output of the output summing circuit a synchronization of the output signals of the first and second amplifiers and a relative carrier-signal level which is identical with that of the signal applied to the input of the device.

4. An amplification device according to claim 3, wherein the subtracter circuit, the coupling device and the summing circuit are 3-dB hybrid couplers at 90°, the filtering circuit being constituted by a narrow-bandpass filter preceded and followed by a frequency converter.

5. An amplification device according to claim 2 for receiving a composite television signal and further comprising an audio carrier signal modulated by an audio-frequency item of information, wherein said device comprises a third amplifier for amplifying the audio carrier signal, the output of said third amplifier being connected to a first input of a second summing circuit, the output of the second amplifier being coupled to the second input of the output summing device through the second input and the output of the second summing circuit.

* * * * *